United States Patent
Bradbury

(10) Patent No.: US 9,115,035 B2
(45) Date of Patent: Aug. 25, 2015

(54) PELLETIZED ORGANIC FERTILIZER

(75) Inventor: Rod Bradbury, Saanichton (CA)

(73) Assignee: STET ACQUISITION, INC., Irvine, TX (US)

(*) Notice: Subject to any disclaimer, the term of this patent is extended or adjusted under 35 U.S.C. 154(b) by 0 days.

(21) Appl. No.: 13/617,054

(22) Filed: Sep. 14, 2012

(65) Prior Publication Data

US 2013/0125598 A1 May 23, 2013

Related U.S. Application Data

(60) Provisional application No. 61/534,474, filed on Sep. 14, 2011, provisional application No. 61/593,958, filed on Feb. 2, 2012.

(51) Int. Cl.
| | |
|---|---|
| *C05C 11/00* | (2006.01) |
| *C05B 15/00* | (2006.01) |
| *C05B 17/00* | (2006.01) |
| *C05F 1/00* | (2006.01) |
| *C05G 3/00* | (2006.01) |
| *C05D 1/00* | (2006.01) |

(52) U.S. Cl.
CPC .............. *C05C 11/00* (2013.01); *C05B 15/00* (2013.01); *C05B 17/00* (2013.01); *C05F 1/002* (2013.01); *C05G 3/0047* (2013.01)

(58) Field of Classification Search
CPC ........ C05C 11/00; C05C 11/02; C05B 15/00; C05B 17/00; C05F 1/002; C05F 1/005; C05G 3/0047; C05D 1/02
See application file for complete search history.

(56) References Cited

U.S. PATENT DOCUMENTS

| | | | |
|---|---|---|---|
| 4,743,287 A | * | 5/1988 | Robinson ............. 71/12 |
| 5,443,613 A | | 8/1995 | Robinson |
| 5,730,772 A | | 3/1998 | Staples |
| 5,772,721 A | | 6/1998 | Kazemzadeh |
| 5,876,479 A | | 3/1999 | Hedgpeth, IV |
| 6,228,806 B1 | | 5/2001 | Mehta |
| 6,254,654 B1 | | 7/2001 | Van Barneveld |
| 6,517,600 B1 | | 2/2003 | Dinel |
| 6,936,681 B1 | * | 8/2005 | Wertz et al. ............ 528/259 |
| 2004/0009878 A1 | | 1/2004 | Lynch et al. |

(Continued)

FOREIGN PATENT DOCUMENTS

| | | |
|---|---|---|
| EP | 0968980 A2 | 5/2000 |
| WO | WO9302023 A1 | 2/1993 |

(Continued)

OTHER PUBLICATIONS

BC Growers Association, "Welcome Harvest Farms" pp. 1-6, Aug. 1, 2009.*

(Continued)

*Primary Examiner* — Jennifer A Smith
(74) *Attorney, Agent, or Firm* — David W. Carstens; Shaukat A. Karjeker; Carstens & Cahoon, LLP

(57) ABSTRACT

An organic fertilizer and method for making the same. The organic fertilizer comprises a slow release nitrogen source, a nitrogen source, a phosphorous source, a potassium source, a chelator, and a binder. The fertilizer is made by mixing the dry ingredients with water to form a wet mixture. Thereafter the wet mixture is extruded through an extruder and cut to form a pellet. The pelletized fertilizer allows the fertilizer to be more accurately applied.

18 Claims, 2 Drawing Sheets

(56) References Cited

U.S. PATENT DOCUMENTS

| | | |
|---|---|---|
| 2008/0134737 A1 | 6/2008 | Binder et al. |
| 2008/0269053 A1 | 10/2008 | Less et al. |
| 2009/0133457 A1 | 5/2009 | Phillips et al. |
| 2009/0255176 A1 | 10/2009 | Giovannetti |
| 2010/0058822 A1 | 3/2010 | Bargiacchi |
| 2010/0248966 A1 | 9/2010 | Lynch et al. |
| 2011/0218102 A1* | 9/2011 | Anderson et al. ............ 504/101 |
| 2013/0192322 A1* | 8/2013 | Miller .............................. 71/23 |

FOREIGN PATENT DOCUMENTS

| | | |
|---|---|---|
| WO | WO2005117581 A1 | 12/2005 |
| WO | WO2010122501 A2 | 10/2010 |

OTHER PUBLICATIONS

Organic Info Hub, FAQ on Organic Agriculture pp. 1-6, 2002.*

* cited by examiner

PELLETIZED ORGANIC FERTILIZER

CROSS-REFERENCE TO RELATED APPLICATION

This application is a continuation-in-part of U.S. Provisional Patent Application No. 61/534,474, entitled "Pelletized Organic Fertilizer," filed Sep. 14, 2011, the technical disclosure of which is hereby incorporated herein by reference. The application is also a continuation-in-part of U.S. Provisional Patent Application No. 61/593,958, entitled "Pelletized Organic Fertilizer," filed Feb. 2, 2012, the technical disclosure of which is hereby incorporated herein by reference.

BACKGROUND OF THE INVENTION

1. Technical Field

The present invention relates to a pelletized organic fertilizer and method for making the same.

2. Description of Related Art

As crops are grown, especially after repeated planting cycles, the quantity of the available nutrients in the soil which are necessary to grow the crops becomes depleted. Nutrient fertilizers are applied to soil in which crops and ornamentals are grown to replace these depleted nutrients.

There is a strong movement to purchase organic products. Often, consumers are willing to spend a premium for organic products. In order to have the crops certified organic, organic producers must demonstrate that every step in the process, including fertilizing, comprised verified organic materials and approved practices.

The available organic fertilizer typically comprises simple manure. The prior art fertilizer fails to provide the slow nitrogen release which is available with inorganic fertilizer. Consequently, due to the ineffective fertilizers employed during organic farming, farmers must rotate crops to prevent soil depletion and provide the necessary nutrients plants require. This in turn causes a decreased yield in the desired crop. Therefore, a need exists to provide a suitable organic fertilizer.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicants' invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
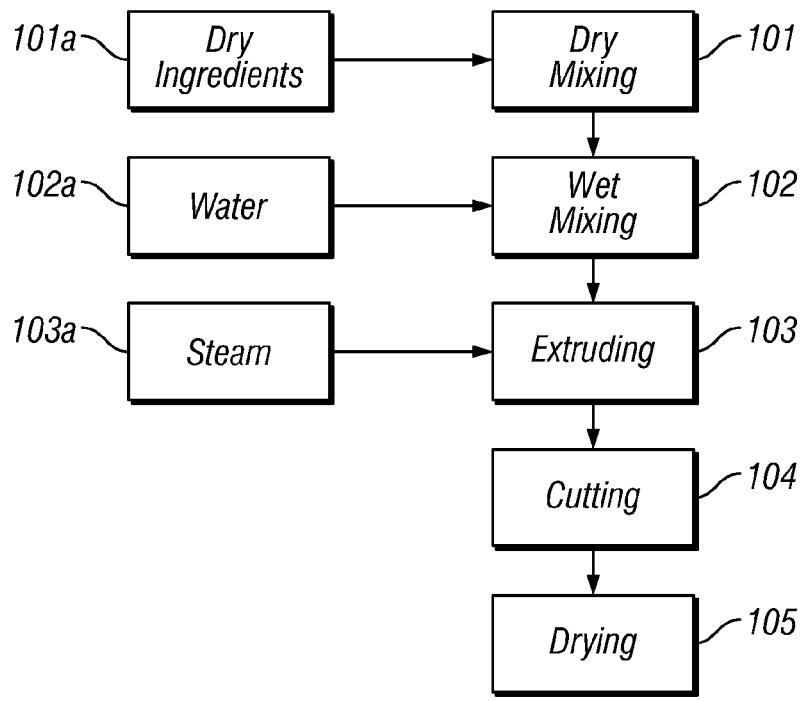
FIG. 1 is a process flow chart of a method for making a pelletized organic fertilizer in one embodiment.

In one embodiment an organic fertilizer and method for making the same is provided. FIG. 1 is a process flow chart of a method for making a pelletized organic fertilizer in one embodiment. The first step in one embodiment is introducing dry ingredients 101a, which are discussed below.

The term "organic" includes materials having a molecular skeleton comprising a carbon backbone, for example compositions derived from living matter. The term "organic" also comprises materials which are "verified organic." As used herein, the term "verified organic" refers to crops or materials which meet or exceed the standards of the National Organic Program as set forth by the United States Department of Agriculture. In one embodiment, the term "verified organic" also encompasses ingredients which are not manufactured or mined at approved locations but are otherwise eligible for "verified organic" status. In one embodiment the term "organic" also encompasses mined materials. For example, soft rock phosphate is a mined material, not derived from organic manner, but allowable for use in organic agriculture and is capable of being "verified organic." Such items are deemed to be organic. Generally, inorganic fertilizers are manufactured from non-living materials, and include, for example, ammonium nitrate, ammonium sulfate, urea, ammonium phosphate, potassium chloride, etc. Inorganic fertilizers are readily available and are generally inexpensive but have a number of disadvantages. Many inorganic fertilizers suffer from leaching whereby nutrients cannot reach the desired plant. Leaching may occur due to irrigation and can contaminate drinking water, wells, lakes, etc. Because the nutrients do not reach the plant, the fertilizer is essentially wasted. Furthermore, inorganic fertilizers often result in a build-up of toxic concentrations of salts due to overuse or sustained use.

Table 1 below illustrates the formulation of the dry ingredients in an organic fertilizer in one embodiment. In one embodiment all ingredients in the organic fertilizer are organic. As depicted the formulation includes a slow release nitrogen source, a nitrogen source, a phosphorous source, a potassium source, a binder, and a chelator. Each of these will be discussed in more detail below.

| Ingredient | Range Weight % | Sample Embodiment (Weight %) |
|---|---|---|
| Slow release nitrogen source | 40-80 | 55.0 |
| Immediate Nitrogen Source | 0-15 | 5.0 |
| Phosphorous Source | 10-50% | 30.0 |
| Potassium Source | 0-15% | 6.0 |
| Binder | 1-6% | 3 |
| Chelator | 0-3% | 1 |
| Total | | 100.0 |

A slow release nitrogen source is a source which is still releasing nitrogen and which has at least 50% of available nitrogen remaining after three months during normal soil temperatures and conditions. In one embodiment the slow release nitrogen source accounts for between about 40-80% of the dry formulation. The slow release nitrogen source can comprise a single ingredient or it can comprise multiple ingredients. In one embodiment the slow release nitrogen source comprises blood meal and/or feather meal.

In one embodiment blood meal ranges from about 0 to about 85% of the formulation. In another embodiment the blood meal ranges from about 35-65% of the total formulation. In another embodiment the blood meal comprises about 50.0 weight percent of the dry formulation. In one embodiment the blood meal comprises at least greater than 10% nitrogen. In another embodiment the blood meal comprises at least greater than 14% nitrogen. The blood meal can comprise blood from a variety of animals, but in one embodiment the blood meal comprises poultry blood meal. The blood meal can also comprise turkey and porcein blood meal. As used herein blood meal refers to clean fresh blood from an animal exclusive of feathers, hide or skin except in such traces which might occur unavoidably in good manufacturing practices. Moisture can be removed from the blood meal prior to using in the formulation by any conventional method. In one embodiment the poultry blood meal comprises about at least 85% protein, about 3.5 to about 8% moisture, and less than about 1% fat.

The blood meal can be obtained from a variety of sources. In one embodiment the blood meal is in a powder form. In one embodiment the blood meal is still releasing nitrogen two weeks after application.

In one embodiment the slow nitrogen source comprises feather meal in an amount of about 1 to about 10% of the formulation. Feather meal provides a slow release nitrogen source which allows for a delayed release of nitrogen. In one embodiment the feather meal comprises at least greater than 8% nitrogen. In another embodiment the feather meal comprises at least greater than 11% nitrogen. Feather meal refers to hydrolyzed clean feathers of poultry exclusive of blood except in traces which might occur unavoidably in good manufacturing practices. In one embodiment the feather meal comprises about at least 80% protein, about 3.5 to about 8% moisture, and between about 8-10% fat. In one embodiment the feather meal is ground to form a powder.

The feather meal can be obtained from a variety of sources. In one embodiment, the feather meal is still releasing nitrogen six weeks after the application.

In one embodiment the formulation also comprises an immediate nitrogen source. An immediate source is a source in which the majority of the nitrogen is released within one month after application under normal soil temperatures and conditions. An immediate nitrogen source can comprise some nitrogen which is slowly released, but the bulk of the nitrogen in the immediate nitrogen release is released within three months after application. Thus, a slow nitrogen source may contain both slow release and immediately available nitrogen. For example, blood meal is generally a slow nitrogen source but it may comprise some nitrogen which is more immediately available. Allowing some nitrogen to be absorbed immediately provides flexibility. For example, some plants may require an immediate source of nitrogen but will then not require additional nitrogen until later on in the plant cycle. Being able to control the amount of nitrogen available over time allows the available nitrogen to better mimic the required nitrogen over time.

In one embodiment the immediate nitrogen source comprises at least about 10% nitrogen. The nitrogen source can comprise a variety of sources. In one embodiment the immediate nitrogen source ranges from about 0 to about 15% of the formulation.

In one embodiment the nitrogen source comprises fish emulsion powder. A fish emulsion powder is manufactured by mixing fish carcasses with an organic enzyme. Fish emulsion powder provides an immediate release of nitrogen. In one embodiment organic fish protein which has been spray dried and hydrolyzed is utilized. The fish emulsion powder is typically ground and dried before being packaged. Thus, in one embodiment the fish emulsion powder comprises a powder form. In one embodiment the fish emulsion powder is soluble in water and thus has high proportion of water solubility. This is beneficial in that it helps in the delivery of nutrients to the plant following application. Fish emulsion in water is considered an organic ingredient.

In one embodiment the fish emulsion powder comprises at least about 11% nitrogen. In one embodiment the fish emulsion powder comprises at least about 0.25% $P_2O_5$, whereas in another embodiment the fish emulsion powder comprises at least about 1% $K_2O$. Accordingly, when used, the fish emulsion powder also provides a source of potassium and phosphorus. As noted, both of these are required by the plant. In one embodiment at least a portion of the potassium and phosphorus in the fish emulsion powder are immediately available for release.

In one embodiment the formulation comprises a phosphorus source. In one embodiment the phosphorus source accounts for between about 10 to about 50% of the formulation. In one embodiment soft rock phosphate is utilized. The soft rock phosphate is also known as colloid phosphate and soft phosphate with clay. In one embodiment the soft rock phosphate is sized so that all of the soft rock phosphate passes through a 100 mesh screen. In one embodiment the soft rock phosphate comprises between about 6% to about 30% moisture. In another embodiment the soft rock phosphate is mixed with water to make pellets comprising a diameter from about ⅙ of an inch to about ⅓ of an inch. The soft rock more readily turns into an ionic state, which is the only way plants can uptake nutrients. In one embodiment the soft rock phosphate is water soluble. In one embodiment the soft rock phosphate is deemed an organic ingredient.

In one embodiment the soft rock phosphate comprises about 1% to about 30% available phosphate in the form of $P_2O_5$ whereas in other embodiments the available phosphate is between about 2% and 10%. In one embodiment the total phosphate in the form of $P_2O_5$ ranges from about 10% to about 50% whereas in another embodiment the total phosphate is between about 15% and 35%. Additionally, in one embodiment the soft rock phosphate comprises between about 10% and 30% calcium. Other ingredients such as insoluble phosphate, fluoride, aluminum oxide, and impurities may also be present in the soft rock phosphate.

In one embodiment the soft rock phosphate is considered a slow release source. In one embodiment the soft rock phosphate is not generally soluble in water. Accordingly, the soft rock phosphate is still releasing nutrients such as phosphate at least two weeks after application. In one embodiment the soft rock phosphate is still releasing phosphate at least six weeks after application. The phosphorus can be added via other sources as well such as humic acid, fish emulsion, crab meal, yucca, sewage sludge, animal manures, and compost.

As noted in one embodiment the formulation also comprises a potassium source. In one embodiment the potassium source accounts for between about 0 to about 15% of the formulation. In one embodiment sulfate of potash ($K_2SO_4$) is utilized. Sulfate of potash, or potash sulfide, is a type of potassium sulfate. Sulfate of potash is a natural potash mineral that contains about 50% potassium oxide ($K_2O$), commonly referred to as potash, and about 50% sulfate ($SO_4$). Sulfate of potash is a natural, mined, very low chloride form of potassium sulfate that is water soluble. Thus, sulfate of potash is deemed organic. It also promotes the use of nitrogen and other nutrients. Potassium is a component of the fluids which flood plant tissue. Because potassium deficient plants are susceptible to insect attack, disease, etc., potassium helps ensure high quality plants and produce. Sulfur is used by plants in the formation of amino acids, enzymes, and other functions. Sulfate of potash provides both sulfur and potassium. In one embodiment, the sulfate of potash is in a powder form and comprises a moisture content of less than 2%.

In one embodiment the sulfate of potash is considered an extended release source as it is releasing potassium at least two weeks after application. In one embodiment the sulfate of potash is still releasing potassium at least three weeks after application, whereas in yet another embodiment the sulfate of potash is still releasing potassium at least four weeks after application. Other potassium sources can also be utilized including potassium chloride, bone meal, avian manure, any non-human manure, and seaweed.

The phosphate and potash offer many benefits. One benefit is the ability to deliver these nutrients to the plant. The soil, like the plant, also demands these nutrients. By concentrating the nutrients, the soil's demand for these nutrients is satisfied with sufficient nutrients remaining to benefit the plant.

As noted above, in one embodiment the formulation comprises a chelator. The chelator can comprise many different ingredients such as humic acid, potassium humate, fulvic acid, amino acids, and ethylenediaminetetraacetic acid. In one embodiment the chelator accounts for between about 0 to about 3% of the formulation, whereas in other embodiments the chelator accounts for about 1.0% of the formulation. In one embodiment the chelator is water soluble. The chelator stimulates the plant into being ready to absorb nutrients.

As noted the formulation further comprises a binder. The binder acts to bind all of the dry ingredients when mixed with water. In one embodiment the binder is water soluble. In one embodiment, the binder also functions as a chelator. Thus, upon application of water the binder allows the ingredients to be leached and absorbed individually and at the desired rates. In one embodiment the binder accounts for between about 1% to about 6% of the formulation. In one embodiment the binder accounts for about 3% of the formulation. In one embodiment the binder comprises lignin sulfonate, some examples of which include calcium lignosulfonate, sodium lignosulfonate, sodium oxyligninsulfonate, ammonium lignosulfonate, azo lignosulfonate, and combinations thereof. In one embodiment the binder comprises BorrePlex CA Powder produced by Borregaard Ligno Tech of Rothschild, Wis. BorrePlex CA is a calcium lignosulfonate based product. This binder is deemed organic, and in some cases, is deemed verified organic.

Figure 2A:
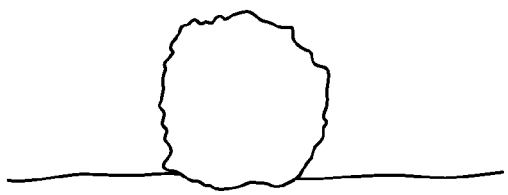
FIG. 2A is a side profile of a pellet in one embodiment located on the ground.
Figure 2B:
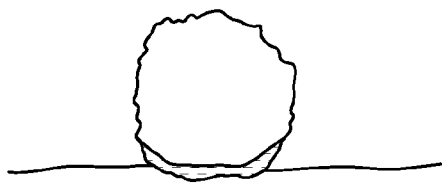
FIG. 2B is a side profile of a pellet in one embodiment beginning to wick moisture and bring the moisture into the pellet.
Figure 2C:
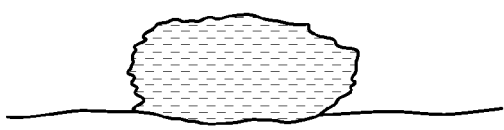
FIG. 2C is a side profile of a pellet in one embodiment which has begun to crumble.
Figure 2D:
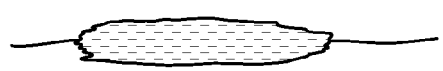
FIG. 2D is a side of the pellet in one embodiment which has crumbled and is converted to a digestible form.

As will be discussed below, the binder, in one embodiment, holds all of the dry ingredients together in a pellet which has a moisture content of less than about 15% by weight. In one embodiment, upon application of the pellet, the binder acts to wick moisture and bring moisture to the granule. FIGS. 2A-2D illustrate the transformation of the pellet into a digestible form. FIG. 2A is a side profile of a pellet in one embodiment located on the ground. FIG. 2B is a side profile of a pellet in one embodiment beginning to wick moisture and bring the moisture into the pellet. This begins the process of turning the pellet into a mush so that it can subsequently crumble. At this point, microbes can attack the granule and convert the nutrients into a water soluble plant accessible form. FIG. 2C is a side profile the pellet in one embodiment which has begun to crumble. FIG. 2D is a side of the pellet in one embodiment which has crumbled and is converted to a digestible form.

As discussed, in one embodiment the binder is sufficiently adhesive to adhere the dry ingredients to one another, after the application of water, into a low moisture granule. However, upon subsequent application of water, the binder allows the ingredients to become a mush which can be attacked by microbes.

Now that the ingredients 101a have been discussed, a method for manufacturing will now be addressed. There are a variety of ways to manufacture the formulation. Referring back to FIG. 1, in one embodiment the first step in this embodiment is dry mixing 101. In this step the dry ingredients 101a are mixed together to form a dry mixture. In one embodiment all ingredients comprise a dry powder. In one embodiment the dry ingredients 101a comprise a slow release nitrogen source, an immediate nitrogen source, a phosphorus source, a potassium source, a chelator, and a binder. During the dry mixing step 101, all of the dry ingredients 101a can be placed into a batch at once or individual ingredients can be separately added and mixed. In one embodiment each ingredient is added individually and allowed to agitate for about 5 minutes before the addition of an additional ingredient. Thus, for example, a slow release nitrogen source will be mixed with an immediate nitrogen source for a short time before adding a phosphorus source.

The second step, in one embodiment, is the wet mixing stage 102 during which water 102a is mixed with the dry mixture to form a wet mixture. It should be noted that liquid water, steam, or other moisture source can be used as the water 102 added during the wet mixing stage 102. As depicted water 102a is added after all dry ingredients 101a have been added and mixed, whereas in other embodiments water 102a is added simultaneously with the dry ingredients 101a. Thus, in one embodiment the dry mixing 101 and the wet mixing 102 occur simultaneously. In one embodiment water is added to comprise between about 3% and about 25% of the final granule. In another embodiment, water is added to comprise a moisture content of less than about 15% by weight of the final granule. In still another embodiment, water is added to comprises between about 3% and 5% of the final granule.

After the water 102a has been added to form a wet mixture, the wet mixture is mixed for a specified time. In one embodiment the wet mixture is mixed for about 10 minutes.

After mixing is the extruding step 103 during which the wet mixture is extruded through an extruder to form extrudate. Various types of extruders can be utilized. In one embodiment, the extruder comprises a double barrel extruder.

In one embodiment steam 103 is injected into the extruder. This steam can be wet steam or dry steam. In one embodiment, the steam provides pressure to force the wet mixture through the extruder. The extruder can also be screw fed.

In another embodiment, steam, such as saturated steam, is mixed with the dry powder. In one embodiment the steam is added in lieu of liquid water, whereas in another embodiment liquid water and steam are added to the dry mixture. The steam acts as an additional binder as well as provides pressure for the extruder. In one embodiment the steam has an inlet temperature from about 145 to about 190° C., whereas in another embodiment the steam has an inlet temperature of about 165° C.

The steam 103 can serve several purposes. First, the steam can act as a moisture source. Second, the steam, and its elevated temperatures sanitizes the material. Because in one embodiment all natural organic materials are used, the sanitization is beneficial. It should be noted that sanitization is not required. Second, depending on the temperature and amount of steam, in one embodiment the extrudate need not be dried prior to packaging. Put differently, a sufficient amount of steam can be added so that the final desired moisture content of the granule is achieved without any subsequent drying steps. This is beneficial in that it reduces unit operations required during manufacturing. If steam is used as a moisture source, in one embodiment, additional water need not be added.

In one embodiment, after exiting the extruder, the extrudate is cut during a cutting step 104 to form a pellet. The cutting step 104 can occur in various methods. In one embodiment rotating knives are located on the face of the extruder. The size, speed, and placement relative to the extruder face can be varied to control the size and shape of the pellet. In one embodiment the extruded pellets are between about 1/32 and 1/4 of an inch long. In another embodiment, the extruded pellets are about 1/32 and 5/32 long. In one embodiment, the pellets are about 1/4 of an inch wide.

The outlet temperature of the extrudate exiting the extruder can vary, but it one embodiment the outlet temperature ranges from about 85 to about 105° C., whereas in one embodiment the outlet temperature is about 95° C.

In one embodiment after extrusion the pellets are dried in a drying step 105 to a desired moisture content. In one embodiment the desired moisture content ranges from 5% to about 25%, whereas in another embodiment the final moisture content is less than about 15%. The pellets can be dried with any means known in the art including an oven, a dryer, or even drying with ambient air. In one embodiment the pellets are dried in a vibratory fluid-bed drier. As discussed, in another embodiment a drying step 105 is unnecessary. In one embodiment subsequent to or simultaneously with the drying step 105 the pellets are cooled before packaging. The cooling can be accomplished with any method, including ambient air. It should be noted that in some embodiments no drying step 105 is needed. Whether a drying step 105 is needed is dependent upon a variety of factors including the final desired moisture content. The drying step offers several benefits. First it prevents the potential formation of mold. Second, when the pellets have reached a desirable moisture content, they become free-flowing as a result of avoiding clumping which can occur from excess moisture.

Figure 3:
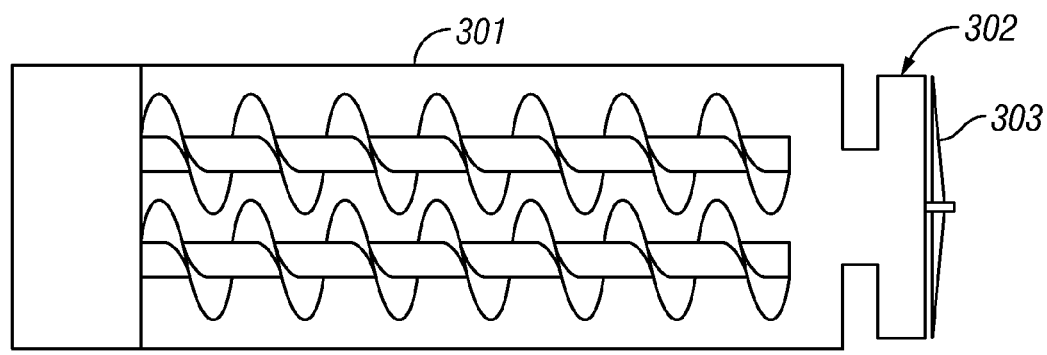
FIG. 3 is a side profile of an extruder in one embodiment.

FIG. 3 is a side profile of an extruder in one embodiment. As shown the extruder 301 comprises a double barrel extruder. The ingredients are mixed and urged through the extruder 301 to the die 302. The dough is forced through the die 302 where the extrudate is subsequently cut with a blade 303. It should be noted that this figure is for illustrative purposes only and should not be deemed limiting. For example, while a rotating blade 303 is illustrated other blades may be suitably utilized.

After drying 105, in one embodiment the dried pellets are conveyed to a sieving machine where the pellets are sized. This allows oversized pellets to be removed. During this time the pellets are cooled. Thereafter, the pellets are packaged.

It should be noted that in different embodiments the methods comprise different steps. For example, as noted above, in one embodiment there is no need to add water 102a to the dry mix. In such an embodiment, the steam 103a provides the necessary moisture. In a different embodiment no steam 103a is added. Instead, water 102a provides the required moisture.

Table 2 illustrates the formulation of the final pellets in one embodiment. In one embodiment the final pellets are homogenously mixed. Therefore, a representative sample will fairly represent the entire sample.

|  | Range | One embodiment |
|---|---|---|
| Total Nitrogen | 5-15% | Greater than about 8% |
| Total Phosphorus (as $P_2O_5$) | 2-10% | Greater than about 6% |
| Total Potassium (as $K_2O$) | 1-6% | Greater than about 3% |
| Total Sulfur | 0.5-2% | Greater than about 1% |

In one embodiment the total nitrogen levels are determined by AOAC 978.02, the phosphorus levels are determined by AOAC 958.01, the total potassium levels are determined by AOAC 958.02, and the total sulfur levels are determined by AOAC 980.02. In one embodiment the bulk density of the final pellets is between about 0.3 and 0.55 g/mL and the packed density is between about 0.35 and 0.7 g/mL.

Applicants have discovered that obtaining a desired moisture content is an important factor in pelletizing the pellets. Applicants have discovered that too much moisture results in undesirable mold whereas too little moisture does not allow for pelletizing. The ingredients, as well as the outside humidity, must be monitored for moisture content. The ratios of the ingredients can be varied to ensure a proper moisture content is maintained. As an example, the moisture content of blood meal, feather meal, and fish emulsion often varies. Accordingly, in one embodiment, the manufacturer monitors the moisture content of these ingredients and adjusts the ratios accordingly to reach and maintain a desired moisture content.

Furthermore, Applicants have discovered that products comprising higher protein are more difficult to pelletize as they will not bind sufficiently. Accordingly, the ratios of the binder and nitrogen ingredients can be adjusted as needed.

Figure 4:
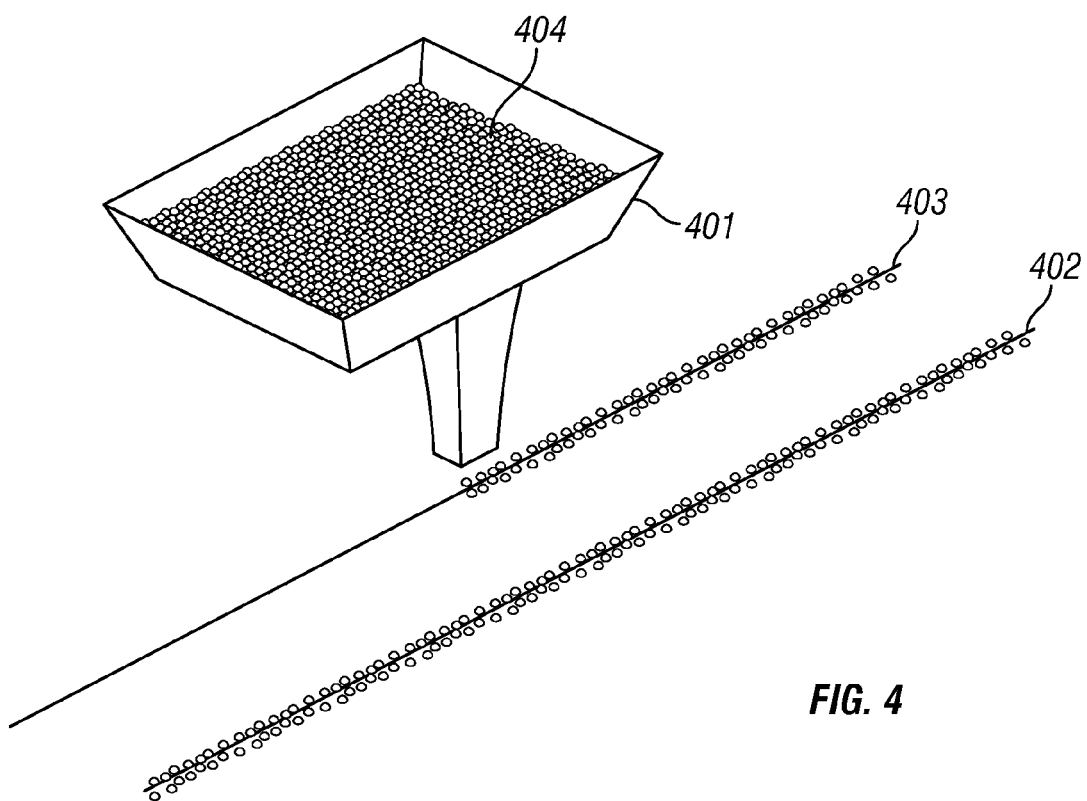
FIG. 4 is a perspective view of an applicator in one embodiment.

After an extruded pellet has been dried and sized, the pellets can be applied. Applicants have discovered many benefits to the pelletized organic fertilizer. First, the fertilizer can be more accurately distributed. This provides that the fertilizer can be applied directly where it is needed most. For example, the pelletized fertilizer can be applied directly to the stem of the plant. FIG. 4 is a perspective view of an applicator in one embodiment. As depicted the applicator 401 is applying pellets 404 along two seed lines 402, 403. Thus, as depicted seeds have been planted along the seed lines 402, 403. Using an applicator, a user can accurately apply the fertilizer along the seed lines 402, 403. This allows nutrients to be absorbed and delivered directly to the plant, seed, and/or soil. In one embodiment the fertilizer is applied along a seed zone. In one embodiment the seed zone comprises land which is about 2 inches below, and about 2 inches on both sides of the seed line 402, 403. Accordingly, the nutrients are concentrated in a small band of land as opposed to spreading all over. This allows the nutrients to concentrate in a zone which is more accessible to the plant, which increases the effectiveness of the nutrients.

Second, because the fertilizers can be delivered accurately, the desired amount of fertilizer can be utilized by the plant. Consequently, only the necessary amount of fertilizer is used. This is beneficial in that less fertilizer is wasted which makes the disclosed fertilizer and method more economical. Further, as all of the fertilizer is used, the carry over effect is minimized or eliminated. As previously discussed, prior art methods disclosed adding fertilizers in excess. An excessive amount of fertilizer was previously required due in part to the ineffective method of application which allowed for runoff. Therefore, in order to account for fertilizer lost to leaching or runoff, farmers began using more fertilizer than was necessary resulting in a carry offer. As the fertilizer application can be better controlled, the amount of fertilizer lost to runoff or leaching is reduced or eliminated. Consequently, the need to use more fertilizer to compensate for the lost fertilizer is likewise reduced or eliminated. As such, one benefit is the reduction of the carryover effect. Thus, in one embodiment the ingredients provided to the plants and soil closely mirror the ingredients required by the plants and soil.

Likewise, an additional benefit is the reduction or elimination of runoff. As previously noted, runoff provides many environmental concerns. These concerns are mitigated with the method and formulation of the pelletized organic fertilizer for a variety of reasons. First the reduction or elimination of runoff helps mitigate environmental concerns by preventing unwanted components from undesirably entering lands and waterways. Second, in one embodiment the formulation does not contain ammonia, nitrates, or other undesirable synthetic ingredients which can be harmful to rivers, soil, etc.

As noted, in one embodiment the fertilizer and methods of this invention can be utilized to reduce runoff. First, a pelletized organic fertilizer as disclosed is created. Next, the user determines the required amount of pelletized organic fertilizer. One skilled in the art, knowing the formulation of the organic fertilizer as well as the crop, soil formulation, etc., can determine the required amount of fertilizer. Next, the required amount of organic fertilizer is applied. As noted, because only the amount of fertilizer which is required is applied, runoff is reduced or eliminated. The pelletized fertilizer can be applied in a variety of manners. In one embodiment the fertilizer is applied by hand. In another embodiment the fertilizer is applied with a spreader. For comparison purposes the farming vegetables typically required about 10-25 tons per acre. Utilizing the pelletized fertilizer disclosed herein a vegetable, such as a tomato, only requires about 60 pounds of fertilizer per acre. As can be seen, this results in a dramatic decrease in the required amount of fertilizer. This results in increased use of nutrients, decreased runoff, and decreased waste.

As noted, the pelletized fertilizer results in increased effective use of nutrients because of the optimized placement relative to the seed or plant. In one embodiment, the pelletized fertilizer additionally provides more nutrients. For example, typical organic compost typically provides 1% nitrogen. Accordingly, 10 tons of compost offers about 200 pounds of nitrogen. However, the organic pelletized fertilizer, in one embodiment, offers about 8% nitrogen. Accordingly, 60 pounds of fertilizer comprise about 4.83 pounds of nitrogen. Thus, the pelletized fertilizer offers increased nitrogen and superior placement of the nitrogen compared to organic compost.

While a pelletization by extrusion method has been described, other methods to make granules can also be utilized. These include, extruders, PAN, and other methods.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.
1. An organic fertilizer comprising:
   a slow release nitrogen source;
   an immediate nitrogen source; and
   a binder.
2. The organic fertilizer according to any preceding clause further comprising:
   a phosphorus source;
   a potassium source;
   a chelator;
3. The organic fertilizer according to clause 2 wherein said slow release nitrogen source comprises blood meal, wherein said immediate nitrogen source comprises fish emulsion powder, wherein said phosphorus source comprises soft rock phosphate, wherein said potassium source comprises sulfate of potash, and wherein said chelator comprises humic acid.
4. The organic fertilizer according to clause 3 comprising about 40 to about 70% slow release nitrogen, wherein said immediate nitrogen source comprises about 1 to about 15%, wherein said phosphorus source comprises about 10 to about 50%, wherein said potassium source comprises from about 1 to about 15%, and wherein said chelator comprises from about 1 to about 3%.
5. The organic fertilizer according to clause 4 wherein said fertilizer comprises pellets.
6. The organic fertilizer according to clause 5 wherein said pellets are sized between 1/32 to about 1/4 of an inch.
7. The organic fertilizer according to clause 3 wherein said slow release nitrogen source further comprises feather meal.
8. The organic fertilizer according to clause 3 further comprising lignosulfonate.
9. The organic fertilizer according to clause 2 wherein all ingredients are organic.
10. The organic fertilizer according to clause 2 wherein all ingredients are verified organic.
11. A method for producing a pelletized organic fertilizer, said method comprising:
   a) mixing a slow release nitrogen source, an immediate nitrogen source, and a binder to form a dry mixture;
   b) adding moisture to form a wet mixture;
   c) extruding said wet mixture through an extruder to form extrudate;
   d) cutting said extrudate to form a pellet.
12. The method according to clause 11 wherein said mixing of step a) comprises adding each ingredient separately.
13. The method according to clauses 11-12 wherein said extruding of step c) comprises injecting dry steam into said extruder.
14. The method according to clauses 11-13 wherein said cutting of step d) comprises cutting to form pellets with a length of between about 1/32 to about 1/4 of an inch.
15. The method according to clauses 11-14 wherein said method does not comprise a drying step after step d).
16. The method according to clauses 11-15 wherein said moisture comprises steam.
17. The method according to clauses 11-16 wherein said mixing further comprises mixing a phosphorus source, a potassium source, and a chelator.
18. The method according to clause 17 wherein during said step a) said slow release nitrogen source comprises blood meal, wherein said immediate nitrogen source comprises fish emulsion powder, wherein said phosphorus source comprises soft rock phosphate, wherein said potassium source comprises sulfate of potash, and wherein said chelator comprises humic acid.
19. A method of reducing runoff, said method comprising the step of:
   a) creating a pelletized organic fertilizer;
   b) determining the required amount of organic fertilizer;
   c) applying said required amount of organic fertilizer.
20. The method according to clause 19 wherein said creating comprises creating a pelletized organic fertilizer, wherein said pelletized organic fertilizer comprises a slow release nitrogen source, an immediate nitrogen source, a phosphorus source, a potassium source, a chelator, and a binder.

What is claimed is:

1. An organic fertilizer having a dry formulation of organic ingredients, said organic fertilizer comprising:
   a slow release nitrogen source, said slow release nitrogen source comprising from about 40% to about 80% of total weight of the organic ingredients of the dry formulation;
   an immediate nitrogen source, said immediate nitrogen source comprising from about 1% to about 15% of total weight of the organic ingredients of the dry formulation; and
   a binder, said binder comprising from about 1% to about 6% of total weight of the organic ingredients of the dry formulation;
   wherein said slow release nitrogen source comprises blood meal, and wherein said immediate nitrogen source comprises fish emulsion powder.

2. The organic fertilizer of claim 1 further comprising:
   a phosphorus source;
   a potassium source; and
   a chelator.

3. The organic fertilizer of claim 2 wherein said phosphorus source comprises soft rock phosphate, wherein said potassium source comprises sulfate of potash, and wherein said chelator comprises humic acid.

4. The organic fertilizer of claim 3 wherein said phosphorus source comprises about 10 to about 50% of total weight of the organic ingredients of the dry formulation, wherein said potassium source comprises from about 1 to about 15% of total weight of the organic ingredients of the dry formulation, and wherein said chelator comprises from about 1 to about 3% of total weight of the organic ingredients of the dry formulation.

5. The organic fertilizer of claim 4 wherein said fertilizer comprises pellets.

6. The organic fertilizer of claim 5 wherein said pellets are sized between 1/32 to about 1/4 of an inch.

7. The organic fertilizer of claim 1 wherein said blood meal further comprises at least 14% by weight nitrogen.

8. The organic fertilizer of claim 3 further comprising lignosulfonate.

9. The organic fertilizer of claim 2 wherein all ingredients are organic.

10. The organic fertilizer of claim 2 wherein all ingredients are verified organic.

11. An organic fertilizer having a dry formulation of organic components, said organic fertilizer comprising:
    a slow release nitrogen source, said slow nitrogen source comprising from about 40% to about 80% of total weight of the organic ingredients of the dry formulation;
    an immediate nitrogen source, said immediate nitrogen source comprising from about 1% to about 15% of total weight of the organic ingredients of the dry formulation; and
    a binder, said binder comprising from about 1% to about 6% of total weight of the organic ingredients of the dry formulation;
    wherein said slow release nitrogen source comprises feather meal, and wherein said immediate nitrogen source comprises fish emulsion powder.

12. The organic fertilizer of claim 11 further comprising:
    a phosphorus source, said phosphorous source comprising from about 10% to about 50% of total weight of the organic ingredients of the dry formulation;
    a potassium source, said potassium source comprising about 15% or less of total weight of the organic ingredients of the dry formulation; and
    a chelator, said chelator comprising about 3% or less of the organic ingredients of the dry formulation.

13. The organic fertilizer of claim 12, wherein said chelator comprises humic acid.

14. The organic fertilizer of claim 12, wherein said binder comprises lignosulfonate.

15. The organic fertilizer of claim 11 wherein said slow release nitrogen source comprises an immediate nitrogen source.

16. The organic fertilizer of claim 11 wherein said fertilizer comprises pellets.

17. The organic fertilizer of claim 16 wherein said pellets are sized between 1/32 to about 1/4 of an inch.

18. The organic fertilizer of claim 12 wherein all ingredients of said fertilizer are organic.

* * * * *